United States Patent Office 2,786,014
Patented Mar. 19, 1957

2,786,014

PLATELET PRESERVATION

James L. Tullis, Newton, Mass.

No Drawing. Application September 10, 1952,
Serial No. 308,951

4 Claims. (Cl. 167—78)

This invention relates to the preservation of platelets outside the living body and, more particularly, to sterile therapeutically effective preparations containing platelets in concentrated form, suitable for in-vivo use as in the field of platelet deficiency therapy.

The primary object of this invention was to devise a means by which platelets could be stockpiled for in-vivo use in case of catastrophic atomic radiation, though such stockpiling for peace-time therapy is alone a worthy object. To this end, it was imperative that platelet integrity outside the human body be prolonged, inasmuch as prior to this invention the stability of intactness—in the sense of preservation of therapeutic effectiveness—of platelets outside living bodies did not exceed three days. Further objects include the preservation of platelets in a form suitable for injection into a living body at high concentrations, for therapeutic purposes.

In accordance with this invention, the duration of platelet integrity has been increased beyond the most optimistic expectations and now greatly exceeds the average in-vivo life span. No final figures on the ultimate time of satisfactory preservation can be given inasmuch as sufficient time has not elapsed since the first platelets were successfully preserved to provide final data. Evidence thus far points to many months of satisfactory preservation.

This invention further provides a practical preservative medium for highly concentrated platelets; and the platelet-containing preservative is in water-soluble and, hence, suitable and convenient form for direct injection into a living body.

Platelets preserved in accordance with this invention are derived from whole blood by any of a variety of separation methods. Though constituting no part of this invention, exemplary separation techniques are:

1. Whole blood treated to prevent clotting, as by the addition of citrate or other calcium sequestering agent, collected in a non-wettable surface sterile system and brought to a temperature near 0° C., may have its red and white cells sedimented with or without the aid of rouleaux-forming agents. The plasma may then be withdrawn and centrifuged at a centrifugal force sufficient to separate and deposit the platelets which then may be washed from the centrifuge with physiologic saline and be concentrated by repeated centrifugation, if required.

2. Whole blood may be passed, without the addition of citrate, over a cation exchange resin on the sodium cycle, some of which sites have been covered with calcium, resulting in a nearly quantitative separation from the whole blood of the platelets with the calcium of the blood. After the passage of the blood through the exchange resin, the platelets may be recovered from the exchange column by equilibrating the column with physiologic saline containing acetate ions and calcium complexing agents, all as described in an application of Edwin J. Cohn entitled "Closed System for Continuous Separation of Components of Body Fluids," Serial No. 281,989, filed April 12, 1952.

The preservative medium of this invention may comprise an aqueous solution containing, per 100 milliliters, about 0.2 gram of sodium acetate, about 5.0 grams glucose and about 0.9 gram sodium chloride. The wet platelet yield from 500 milliliters of whole blood (being the spontaneous sediment from the saline solutions after decanting the supernatant), is then gently stirred into this mixture which is maintained at about 4° C. To this mixture there is added sufficient gelatin in a sterile pyrogen-free neutral aqueous solution so that, after standing, the composition will gel at a temperature of 4° C. In the case of a Knox gelatin of about 60,000 molecular weight and about midway with respect to gelatin fractionation, which is in aqueous solution at a concentration of 8.6%, this will require the addition, at 37° C., of an amount of the gelatin aqueous solution between 0.75% and 3% by volume. After the addition of the gelatin, it is helpful to periodically agitate or invert the solution gently until it gels in a period of about 20 minutes. The final total volume amounts to about 40 cc. with the platelets discretely distributed throughout the gel.

The composition of this volume falls within the preferred following ranges:

| | |
|---|---|
| Gelatin | Between 0.3 and 1.2 grams. |
| Sodium chloride | 0.36 gram. |
| Sodium acetate | .08–0.2 gram. |
| Carbohydrate (glucose) | Not exceeding 2.0 grams. |
| Platelets | In excess of 200,000/mm.$^3$. |

By this procedure, approximately 50% of the original platelets of the blood can be recovered and discretely distributed through a medium having less than $\frac{1}{10}$ the volume of the whole blood. Since the concentration of platelets in average normal human blood is about 200,000 per cubic millimeter, the concentration is increased by a factor in the neighborhood of 5, but more important, of course, is their resulting stability for therapeutic purposes.

Where the separation of the platelets from the blood has taken place in a centrifuge, it is possible to use the preservative solution of this invention (before addition of the gelatin) as the eluting medium and, hence, avoid an intervening sedimentation step.

The gelled platelet-containing preservative can be stored at 4° C. and may be brought to a condition for in-vivo use simply by raising to body temperature, at which temperature the gelatin reverts to a non-viscid liquid.

It is understood that the preparations of this invention, when intended for in-vivo use, are prepared from sterilized ingredients by aseptic techniques and using platelets derived from blood by aseptic and atraumatic techniques.

The acetate anion acts as an anti-agglutinate for the platelets. Other organic acid radicals function in a similar manner and may be added in water-soluble salt form. Only small amounts of such anti-agglutinating agents need be present, as no benefits appear to be derived with concentrations about the range of 0.2–0.5 gram per 100 milliliters.

The glucose is an example of a hypertonicity-increasing agent. Other sugars or carbohydrates, whether nutrient or not, can serve with the saline to impart hypertonicity to the solution. Preferably, they are included in such amounts as to provide a hypertonicity above 320 milliosmoles, the latter being approximately isotonic to body solutions.

An interesting observation resulting from the in-vivo use of compositions of this invention in platelet deficiency therapy is the appearance of therapeutic effectiveness over and above that which would be expected solely from the number of injected platelets. This appears to be due to a thrombo-plastic activity of the gelatin-matrix itself and is possibly accounted for by the fact that, during storage, the platelets interact with trace components of plasma remaining in apposition to the platelet surfaces in such manner as to impart thrombo-plastic activity to the gelatin-matrix itself. In any event, thrombo-plastic activity is manifest even when the platelets have been removed from the preservative medium after storage, particularly where the platelets were not subjected to excessive washing in the process of separating them from the plasma.

I claim:

1. A therapeutic product, suitable for injection into humans at body temperature, comprising a sterile gelled matrix constituted of an aqueous solution of gelatin, water-soluble chloride and acetate salts, and glucose, said matrix being maintained at a temperature of about 4° C., and substantially intact platelets discretely distributed throughout said matrix.

2. A therapeutic product, suitable for injection into humans at body temperature, comprising a sterile gel of the following ingredients:

| | |
|---|---|
| Gelatin | Between 0.3 and 1.2 grams. |
| Sodium chloride | .36 gram. |
| Sodium acetate | .08 to 0.2 gram. |
| Carbohydrate | Not exceeding 2.0 grams. |
| Platelets | In excess of 200,000 per mm.$^3$. |
| Water | To total 40 cc. | maintained at a temperature of about 4° C., said product being liquid at human body temperature.

3. A solid matrix maintained at a temperature of about 4° C. but being liquid at human body temperature, comprising gelatin, water-soluble acetate salt, and viable platelets discretely distributed throughout said matrix in a concentration exceeding 200,000 per mm.$^3$, said matrix having a hypertonicity above 320 milliosmoles.

4. A solid matrix maintained at a temperature of about 4° C., but being liquid at human body temperature, comprising gelatin, water-soluble acetate salt, carbohydrate, chloride salt and viable platelets discretely distributed throughout said matrix in a concentration exceeding 200,000 per mm.$^3$, said matrix having a hypertonicity above 320 milliosmoles.

References Cited in the file of this patent

UNITED STATES PATENTS

| | | |
|---|---|---|
| 2,218,591 | Taylor | Oct. 22, 1940 |
| 2,348,503 | Taylor | May 9, 1944 |

OTHER REFERENCES

Seldon: Anesthesiology, vol. 5, November 1944, pages 566 to 573, particularly page 566.

Journal Biol. Chem., pages 210 to 211, January 1942.

Linzenmeier: Arch. ges. Physiol., vol. 181 (1920), pages 178 to 183, particularly page 178.

Wintrobe: Clinical Hematology, January 1949, pages 192 and 196.

Nance: Journal Pharm. and Pharm., vol. 2, page 273, May 1950.